May 19, 1936.                C. A. CAMPBELL                2,040,976
                         ELECTROPNEUMATIC BRAKE
                         Filed Nov. 23, 1934           2 Sheets-Sheet 1

Inventor
Charles A. Campbell
By
Dodge ald Sons
Attorneys

May 19, 1936.                C. A. CAMPBELL                2,040,976
ELECTROPNEUMATIC BRAKE
Filed Nov. 23, 1934                      2 Sheets-Sheet 2
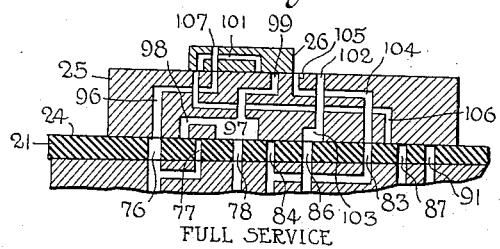
Fig. 2 — FULL SERVICE
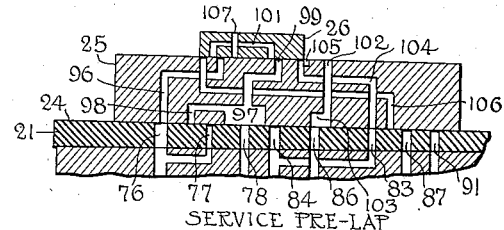
Fig. 3 — SERVICE PRE-LAP
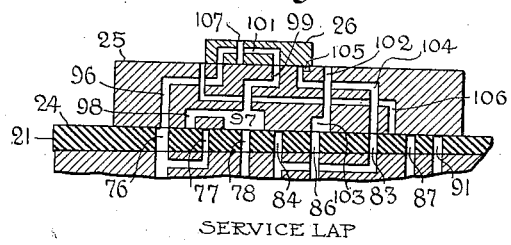
Fig. 4 — SERVICE LAP
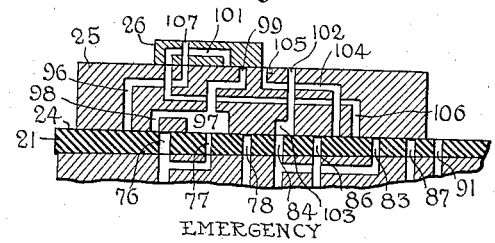
Fig. 5 — EMERGENCY
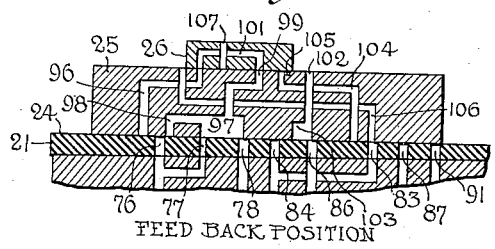
Fig. 6 — FEED BACK POSITION
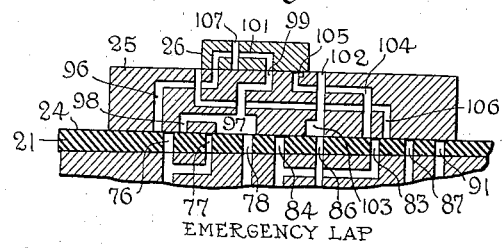
Fig. 7 — EMERGENCY LAP
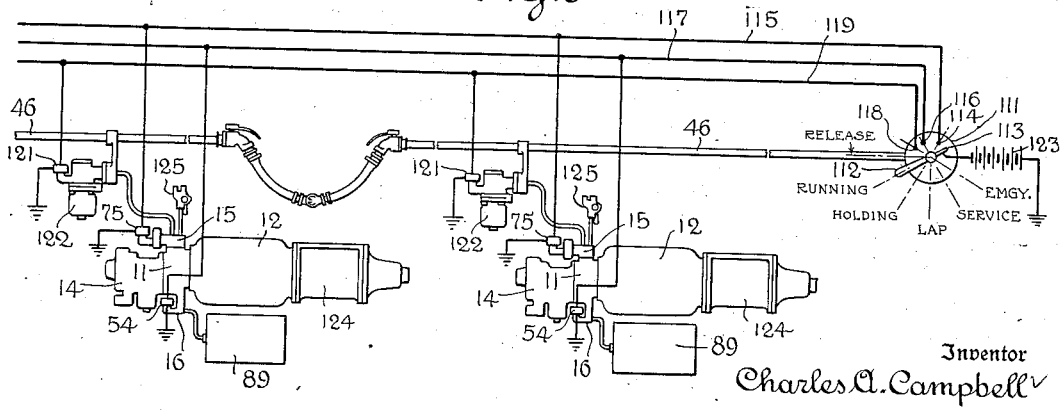
Fig. 9
Inventor
Charles A. Campbell
By
Dodge ___
Attorneys Patented May 19, 1936

2,040,976

UNITED STATES PATENT OFFICE 2,040,976

ELECTROPNEUMATIC BRAKE

Charles A. Campbell, Watertown, N. Y., assignor to The New York Air Brake Company, a corporation of New Jersey Application November 23, 1934, Serial No. 754,492

29 Claims. (Cl. 303—15)

This invention relates to air brakes and particularly to a triple valve mechanism of the electro-pneumatic type.

One feature of the invention is a quick service venting mechanism of the repeating type using a measuring chamber. The quick service venting mechanism is normally put into action by electric means prior to motion of the triple valve, but may be activated pneumatically by the triple valve. The quick service mechanism is so contrived that the measuring chamber is vented in lap position of the triple valve and thus conditioned to function upon an ensuing brake pipe reduction.

In electro-pneumatic systems of the prior art it has been customary to provide an electrically actuated retainer valve in each triple valve, rendered effective in one brake-releasing position of the engineer's brake valve, called holding position, to close the exhaust ports of the triple valves, thus precluding release of the brakes while the reservoirs are undergoing recharge. In a strictly pneumatic triple valve, release is a necessary incident to recharge.

A feature of the present invention is the control of additional functions by the electrically actuated retainer valve mechanism. Two reservoirs, (an auxiliary reservoir and a supplemental reservoir) are associated with the triple valve. When the electrically actuated retainer valve closes the triple valve exhaust port it also isolates the supplemental reservoir and connects the auxiliary reservoir with the brake pipe through a check valve which permits flow in a direction toward the brake pipe.

The electrically actuated retainer valve is arranged to function in conjunction with the triple valve in its service and the various lap positions, to vent pressure fluid from the slide valve chamber to atmosphere when the electrical retainer valve closes the exhaust of the triple valve. In this way the triple valves are caused to shift promptly to release position.

The triple valve has a preliminary position to which it moves on a moderate rise of brake pipe pressure after an emergency application. In such position the auxiliary reservoir and brake cylinder are connected. The electrically actuated retainer valve if then closed connects the reservoir and consequently the connected brake cylinder with the brake pipe so that they "feed back" and assist in charging the brake pipe. During such feed back the supplemental reservoir is isolated. Releasing movement of the triple valve is assisted by the retainer mechanism, and such movement disconnects the brake cylinder from the auxiliary reservoir and connects the brake cylinder to the exhaust port.

When the opening of the electric retainer valve permits brake cylinder exhaust to occur it closes the passage to brake pipe and reconnects the supplemental reservoir.

By the means above outlined, very simple and satisfactory release insuring and feed back actions are secured.

In the drawings,—

Fig. 2 is a view of the slide valve, its seat and the graduating valve of Fig. 1 in full service position.

Fig. 3 is a similar view showing a position preliminary to service lap position and called "service pre-lap".

Fig. 4 is a similar view showing service lap position.

Fig. 5 is a similar view showing emergency position.

Fig. 6 is a similar view showing a position preliminary to emergency lap and called feed back position.

Fig. 7 is a similar view showing emergency lap position.

Fig. 9 is a diagram of controlling connections which may be used.

Figures 1, 8:
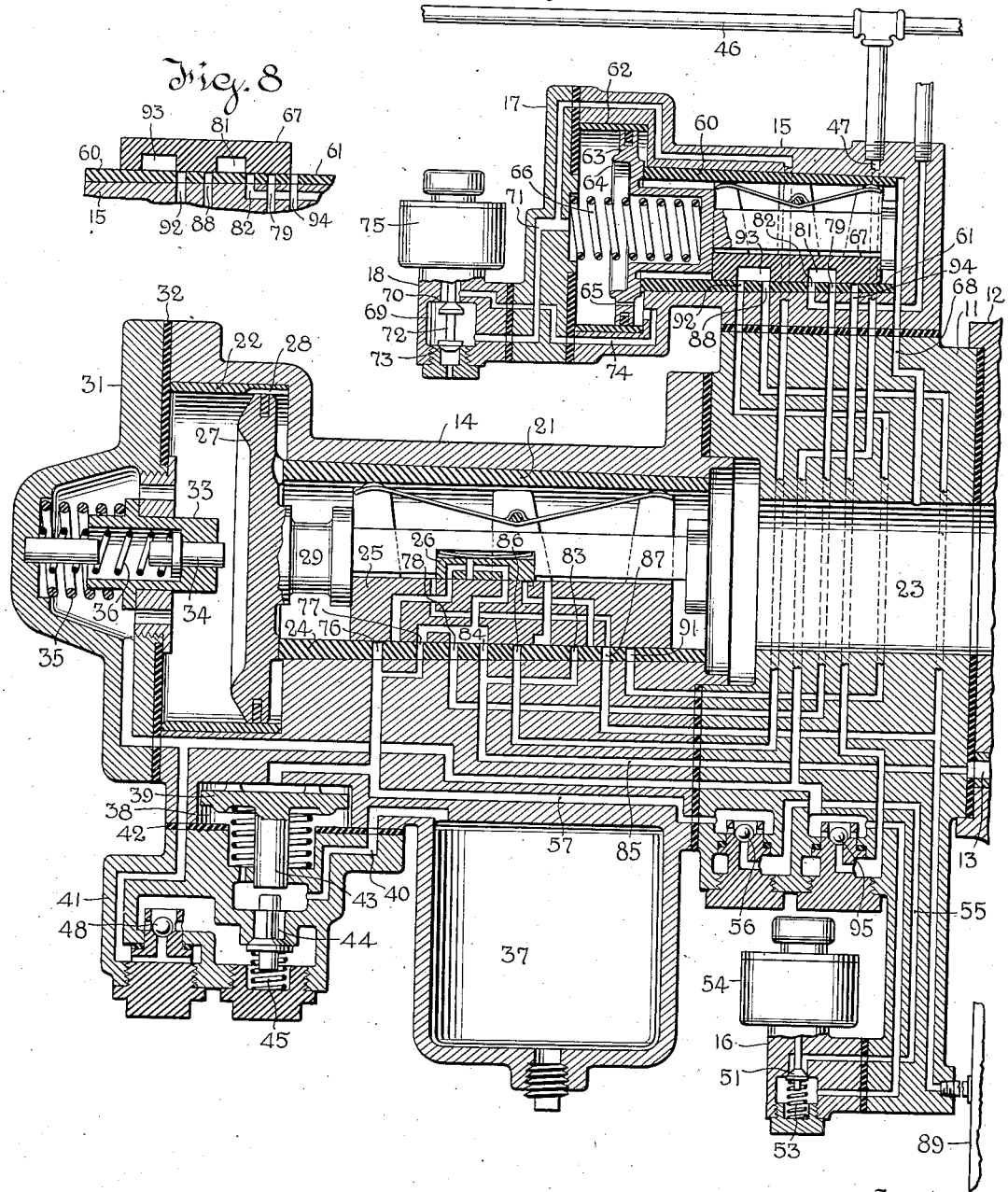
Fig. 1 is a vertical axial section of a triple valve embodying the invention. The parts are shown in release position.
Fig. 8 is a view of the retainer valve of Fig. 1 in retaining position.

A filler piece 11 makes a gasket sealed joint with the head of the auxiliary reservoir 12 which is shown as of the freight type and has a usual brake cylinder pipe 13. Sealed to filler piece 11 by means of suitably ported gaskets are the body 14 of the triple valve, the body 15 of the electrically controlled retainer and feed back valve, and the body 16 of the quick service magnet valve. The body 15 has a front cap 17, on which is mounted the body 18 of the magnet valve for controlling the retaining and feed back functions. Gaskets are interposed as shown.

The triple valve body 14 has the usual valve chamber bushing 21 and cylinder bushing 22. The valve chamber within bushing 21 communicates through passage 23 in filler piece 11 with the interior of auxiliary reservoir 12. The bushing is formed with the usual seat 24 for slide valve 25 upon which is mounted the graduating valve 26. Triple piston 27 works in bushing 22 and controls the charging groove 28. Its stem 29 actuates slide valve 25 with lost motion and actuates the graduating valve 26 positively in a familiar manner.

The front cap 31 has the usual gasket 32 against which piston 27 may seat under emergency and over-reduction conditions, and carries two graduating stems 33 and 34, the latter guided in the former and projecting slightly closer to the piston, so as to act first. Stem 33 is supported by a relatively heavy coil spring 35 and stem 34 by a lighter coil spring 36. When piston 27 engages stop 33 without compressing spring 35 the parts are in service position. At such time spring 36 is slightly compressed. Restoration of stem 34 by spring 36 to the position shown in Fig. 1 moves the parts to service pre-lap position (Fig. 3).

Formed in body 14 is the quick-service measuring chamber 37 and cylinder 38 for the loosely fitted quick service piston 39. A housing 41 closes the lower end of cylinder 38 and a gasket 42 seals the joint and offers a seat against which piston 39 seals when the latter is in its lowermost position. Chamber 37 is connected by passage 40 to the space below piston 39. Piston 39 has a stem 43 which engages and unseats quick service valve 44 of the poppet type, when the piston is forced downward. A spring 45 urges this valve toward its seat.

The brake pipe is shown at 46 and is connected with body 15. It communicates with a branched port 47, portions of which are formed in body 15, filler piece 11, body 14, front cap 31, and housing 41. The various branches lead to the space at the front of triple piston 27, to the space below quick service valve 44 (by way of ball check valve 48 used as a safety device to preclude back flow) and to the chamber below the quick service magnet valve 51. Valve 51 is urged closed by brake pipe pressure and by spring 53. It may be forced open by the excitation of winding 54.

When valve 51 is open, brake pipe air flows by passage 55 through check valve 56 and passage 57 to the space above piston 39. Branches of passage 57 terminate in branch ports in the seat of slide valve 25, as will be explained.

In body 15 are a slide valve chamber bushing 60 formed with a seat 61 for a slide valve, and a cylinder bushing 62. A piston 63 works in bushing 62 and has on its outer face an annular rib 64 which in the outer position of the piston seals on the front cap gasket. Outside this rib a restricted port 65 is formed through the piston. Piston 63 is urged inward by coil spring 66 and engages a slide valve 67 to shift the same without lost motion. A passage 68 connects passage 23 with the valve chamber within bushing 60, so that piston 63 is always subject on its inner face to auxiliary reservoir pressure.

In housing 18 is a chamber 69 connected by passage 71 with the space on the outer or forward side of piston 63. In the chamber 69 is a double-beat poppet valve 72 which normally closes against an exhaust seat 73 to close a restricted exhaust port leading from chamber 69. At such time the valve 72 is away from seat 70 which controls a passage 74 connected with the auxiliary reservoir (through the valve chamber in bushing 61, passages 68 and 23). Valve 72 is actuated by a magnet winding 75 and when this is excited valve 72 is shifted to open the exhaust and close the auxiliary reservoir connection. This reduces the pressure on the outer side of piston 63 and causes the piston to shift outward and seal on the gasket. Energization and de-energization of winding 75 thus shifts valve 67 full stroke in opposite directions. Fig. 1 shows the normal and Fig. 8 the shifted position.

The porting of the seat 24 for triple slide valve 25 is related to the porting of the seat 61 for slide valve 67 so the two can be best described concurrently.

Passage 57 terminates in a main port 76 and a restricted branch port 77 in the seat 24. Exhaust port 78 in seat 24 is in direct communication with port 79 in seat 61 and in the normal position of valve 67 (Fig. 1) a cavity 81 in valve 67 connects port 79 with exhaust port 82, which leads to atmosphere through a manually operable retainer 125 (see Fig. 9). In the abnormal position of valve 67, the valve blanks ports 79 and 82.

The service brake cylinder port 83 and emergency brake cylinder port 84 in seat 24 are connected by passage 85 with brake cylinder pipe 13 and consequently with the brake cylinder. A port 86 in seat 24 communicates with the space on the outer side of piston 63.

A port 87 in seat 24 leads to port 88 in seat 61 and both are in free communication with supplemental reservoir 89 which is connected to filler piece 11. A port 91 in seat 24 leads to port 92 in seat 61. In the normal position of valve 67 (Fig. 1) a cavity 93 in valve 67 connects ports 88 and 92. In the shifted position of valve 67 (Fig. 8) the valve blanks both these ports. In such shifted position valve 67 exposes a feed back port 94 normally blanked thereby and leading through a ball check valve 95 to the brake pipe passage 47.

The slide valve 25 is ported as follows:

There is a through port 96 which in service and the two service lap positions registers with seat port 76. There is an exhaust cavity 97 with branch 98 and through passage 99. In release, cavity 97 and extension 98 connect port 77 and brake cylinder port 84 with exhaust port 78. Cavity 97 registers with exhaust port 78 in service lap and in conjunction with loop port 101 in graduating valve vents port 76 via 96, 101, 99, 97 and 78. A through port 102, not controlled by graduating valve 26, and having an extension 103 at its lower end, registers with the emergency brake cylinder port 84 in emergency (Fig. 5) and with port 86 in positions other than release and emergency. A through port 104 registers with service brake cylinder port 83 in service and service lap positions (Figs. 2–4). At its upper end it has a restricted tail port 105 which alone is exposed in service pre-lap position (Fig. 3) at which time piston 27 is about to move away from stem 34. The graduating valve fully exposes the upper end of port 104 in service and blanks it and its tail port 105 in lap position. A through port 106 controlled at its upper end by the outer edge of valve 26 registers with port 87 to charge the supplemental reservoir in release position and registers with brake cylinder service port 83 in feed back position to connect the brake cylinder and auxiliary reservoir during the feed back.

The graduating valve is provided with a through port 107 which in service position supplies auxiliary reservoir air to port 96 to assist in actuating piston 39.

In the prior art various mechanisms have been associated with the engineer's brake valve to control electric circuits in suitable relation to the control of brake pipe pressure. The simplest scheme uses switching means actuated directly by the brake valve handle, and such a simple embodiment is illustrated in Fig. 9 merely by way of example. In actual practice more complicated systems involving normally closed circuit characteristics would be preferred, but as these form no part of the present invention and are common in the art, the simple scheme illustrated will serve as a satisfactory basis for explaining the operative characteristics of the triple valve. In other words, the particular means used to control the excitation of windings 54 and 75 is immaterial.

In Fig. 9 an engineer's brake valve 111, understood to be of the equalizing discharge type, has a handle 112. This handle has six functional positions familiar in the electro-pneumatic brake art, and commonly designated as release, running, holding, lap, service and emergency. Release, running and lap positions have no electrical functions, and therefore conform in detail to the ordinary pneumatic functions customarily designated by these terms.

Holding position is pneumatically identical with running position, that is to say, it feeds air to the brake pipe through the feed valve. In holding position the contactor 113 moving with handle 112 engages contact 114 and energizes circuit 115 which includes the windings 75 of the electric retainer mechanisms on the several cars.

Service position is pneumatically identical with the usual service position, but in service position the contactor 113 engages contact 116 and energizes the circuit 117 which includes the windings 54 of the quick service magnet valves on the various cars.

Emergency position is pneumatically similar to the usual emergency position, but in this position contactor 113 engages contact 118 and energizes circuit 119. This circuit includes the windings 121 of emergency magnet valves which are not features of the present invention but which when energized will cause the operation of emergency brake pipe vent valves 122.

These vent valves merely vent the brake pipe to atmosphere and the details of their construction being well known and not material to the present application, do not require discussion.

The source of current for the electrical circuits is indicated at 123 in the form of a battery one terminal of which is grounded. The grounding of one terminal of each of the windings 75, 54 and 121 is indicated in the diagram, Fig. 9. In this diagram the brake cylinders mounted on the forward ends of the auxiliary reservoirs 12 are identified by the reference numeral 124, while manually operable retainers are indicated at 125.

The diagram thus shows simple means for energizing the retainer circuit in holding position, the quick service circuit in service position and the emergency circuit in emergency position. Substitution of equivalent controls is recognized as possible and is within the scope of the invention.

Operation

*Charging.*—In charging the engineer's brake valve is placed in release and then running position, as usual. The triple valves assume release position in which charging flow occurs by way of groove 28 to the slide valve chamber and auxiliary reservoir. The supplemental reservoir 89 is charged by way of ports 106 and 87. The space within bushing 60 is charged via passage 68 and an equalizing flow occurs through passage 74 and also through port 65 in piston 63 to the space at the outer side of the piston, valve 72 then closing exhaust 73. Hence, valve 67 is in the position of Fig. 1 under the urge of spring 66.

Brake cylinder is connected to exhaust via 13, 85, 84, 97, 78, 79, 81, and 82.

Quick service chamber 37 is connected to exhaust via passage 40, around the edge of loosely fitted piston 39, port 77, port 98, cavity 97 to port 78 which is connected to atmosphere as above explained.

*Service application.*—With the system charged the engineer's brake valve is moved to service position until the pressure in the equalizing reservoir (forming part of the engineer's brake valve) is suitably reduced, and the valve is then shifted to lap position.

In service position of the engineer's brake valve winding 54 is energized, so that valve 51 is opened and admits brake pipe air against piston 39 via 51, 55, check valve 56. Depression of piston 39 opens valve 44 and brake pipe air flows to chamber 37 via check valve 48, through valve 44 and passage 40.

The resulting depression of brake pipe pressure causes triple piston 27 to shift outward until arrested by stem 33, at which time the valves 25 and 26 are in service position, Fig. 2. Then brake cylinder exhaust is closed and auxiliary reservoir air flows to the brake cylinder via 104, 83, 85, 13. At this time the supplemental reservoir is isolated, port 87 being blanked.

Auxiliary reservoir air is also admitted against piston 39, via 107, 96, 76, so that if the magnet valve 54, fails to function each triple valve will cause quick service venting as it moves into service position, thus expediting service response of other valves.

*Motion to lap position.*—Flow to the brake cylinder will reduce auxiliary reservoir pressure and at or shortly after equalization with the lowered brake pipe pressure spring 36 and stem 34 will shift piston 27 far enough to bring graduating valve to the service pre-lap position, Fig. 3. From there on slow flow to brake cylinder through tail port 105 will cause the piston and graduating valve to creep to service lap position (Fig. 4).

In lap position chamber 37 is vented via 40, past piston 39, ports 76, 96, 101, 99, 97, 78 and thence to atmosphere as described under "charging".

Note that in service and all lap positions of the triple valve, port 102 communicates with port 86 which leads to chamber 69.

*Release after service.*—If the engineer uses release and running positions release will occur in the ordinary way.

If he uses holding position he excites winding 75 and feeds air to the brake pipe. Venting of chamber 69 causes piston 63 to shift valve 67 to the position of Fig. 8 in which the exhaust passage 79 is blanked so the brake cylinder exhaust cannot occur and the supplemental reservoir is isolated by the blanking of ports 87, 88, 91 and 92. (See Figs. 2, 3, 4 and 8.) Air from the slide valve chamber in bushing 21 vents to atmosphere via 102, 86, 71, 69 and 73 causing the triple piston to shift quickly to release position (Fig. 1) in which the venting flow is terminated by the blanking of port 86 by slide valve 25.

Thus recharge occurs while the brakes are retained applied. To release the brakes the engineer deenergizes winding 75 usually by shifting his brake valve to running position. Piston 63 immediately shifts valve 67 back to the position of Fig. 1. This opens the triple valve exhaust passage and the brakes release.

*Emergency application.*—When the engineer shifts his brake valve to emergency position he vents the brake pipe and excites the windings 121 to ensure simultaneous local venting throughout the train.

Piston 27 moves out its full traverse seating on the front cap gasket. The slide and graduating valves assume the position of Fig. 5. Supplemental reservoir air flows via 88, 93, 92, 91 to the slide valve chamber, thence with auxiliary reservoir air via 102, 84, 85 and 13 to the brake cylinder.

This action will occur also when brake pipe pressure is reduced a substantial amount below the point of full equalization between brake cylinder and auxiliary reservoir pressures. Such action is called "over-reduction".

*Release after emergency or over-reduction.*— If the engineer uses release and running positions, the action will be conventional, but if he uses holding position piston 63 will shift valve 67 to the position of Fig. 8. This isolates the supplemental reservoir, closes the exhaust and exposes port 94 so flow starts from the auxiliary reservoir and brake cylinder to the brake pipe, via passage 23, passage 68, port 94 and check valve 95, the brake pipe being now at or about atmospheric pressure.

As brake pipe pressure rises a point will soon be reached at which brake pipe pressure plus the stress in spring 35 will shift piston 27 through the range of travel of stem 33. This brings valves 25 and 26 to feed back position (Fig. 6) in which the brake cylinder and auxiliary reservoir are again connected, now via 83 and 106, so that feed back from brake cylinder and auxiliary reservoir to the brake pipe continues.

In emergency position port 86 was blanked but when the valve reaches feed back and after it reaches emergency lap position port 102 opens into port 86, to perform the release insuring function described in release after service. Hence the triple valves move rather promptly from feed back position (Fig. 6) through emergency lap position (Fig. 7) to release position (Fig. 1).

The brakes do not however actually release until the engineer deenergizes winding 75,—usually by shifting to running position.

While the construction and mode of operation of one embodiment have been described in detail, these are illustrative and subject to modification within the broad scope of the invention as hereinafter defined in the claims.

What is claimed is:

1. The combination of a brake pipe; a brake cylinder; an auxiliary reservoir; a triple valve device of the type having a feed back position assumed on moderate rise of brake pipe pressure following an emergency reduction thereof and in which the brake cylinder is connected with the brake pipe through a feed back connection, said triple valve device having an exhaust port; secondary valve means operable to close said exhaust port and said feed back connection selectively; and means independent of brake pipe pressure for actuating said secondary valve means.

2. The combination of a brake pipe; a brake cylinder; an auxiliary reservoir; a triple valve device of the type having a feed back position assumed on moderate rise of brake pipe pressure following an emergency reduction thereof and in which the brake cylinder and auxiliary reservoir are connected with the brake pipe through a feed back connection, said triple valve device having an exhaust port; secondary valve means operable to close said exhaust port and said feed back connection selectively; and means independent of brake pipe pressure for actuating said secondary valve means.

3. The combination of a brake pipe; a brake cylinder; an auxiliary reservoir; a triple valve device of the type having a feed back position assumed on moderate rise of brake pipe pressure following an emergency reduction thereof and in which the brake cylinder is connected with the brake pipe through a feed back connection, said triple valve device having an exhaust port; secondary valve means operable to close said exhaust port and said feed back connection selectively; and electric means for actuating said secondary valve means.

4. The combination of a brake pipe; a brake cylinder; an auxiliary reservoir; a triple valve device of the type having a feed back position assumed on moderate rise of brake pipe pressure following an emergency reduction thereof and in which the brake cylinder and auxiliary reservoir are connected with the brake pipe through a feed back connection, said triple valve device having an exhaust port; secondary valve means operable to close said exhaust port and said feed back connection selectively; and electric means for actuating said secondary valve means.

5. The combination of a brake pipe; a brake cylinder; an auxiliary reservoir; a supplemental reservoir; a triple valve device connected with said brake pipe, brake cylinder and reservoirs, said triple valve device being of the type which establishes a feed back connection from the brake cylinder to the brake pipe upon a moderate rise of brake pipe pressure following an emergency reduction of brake pipe pressure, said triple valve device having an exhaust port; secondary valve means controlling said exhaust port, said feed back connection and the connection between the supplemental reservoir and the triple valve device, said secondary valve means having two positions in one of which it opens said exhaust port and the supplemental reservoir connection and closes said feed back connection, and in the other of which it opens said feed back connection and closes said exhaust port and supplemental reservoir connection; and means independent of brake pipe pressure for actuating said secondary valve means.

6. The combination of a brake pipe; a brake cylinder; an auxiliary reservoir; a supplemental reservoir; a triple valve device connected with said brake pipe, brake cylinder and reservoirs, said triple valve device being of the type which establishes a feed back connection from the brake cylinder and auxiliary reservoir to the brake pipe upon a moderate rise of brake pipe pressure following an emergency reduction of brake pipe pressure, said triple valve device having an exhaust port; secondary valve means controlling said exhaust port, said feed back connection and the connection between the supplemental reservoir and the triple valve device, said secondary valve means having two positions in one of which it opens said exhaust port and the supplemental reservoir connection and closes said feed back connection, and in the other of which it opens said feed back connection and closes said exhaust port and supplemental reservoir connection; and means independent of brake pipe pressure for actuating said secondary valve means.

7. The combination of a brake pipe; a brake cylinder; an auxiliary reservoir; a supplemental reservoir; a triple valve device connected with said brake pipe, brake cylinder and reservoirs, said triple valve device being of the type which establishes a feed back connection from the brake cylinder to the brake pipe upon a moderate rise of brake pipe pressure following an emergency reduction of brake pipe pressure, said triple valve device having an exhaust port; secondary valve means controlling said exhaust port, said feed back connection, and the connection between the supplemental reservoir and the triple valve device, said secondary valve means having two positions, in one of which it opens said exhaust port and the supplemental reservoir connection and closes said feed back connection, and in the other of which it opens said feed back connection and closes said exhaust port and supplemental reservoir connection; and electric means for actuating said secondary valve.

8. The combination of a brake pipe; a brake cylinder; an auxiliary reservoir; a supplemental reservoir; a triple valve device connected with said brake pipe, brake cylinder and reservoirs, said triple valve device being of the type which establishes a feed back connection from the brake cylinder and auxiliary reservoir to the brake pipe upon a moderate rise of brake pipe pressure following an emergency reduction of brake pipe pressure, said triple valve device having an exhaust port; secondary valve means controlling said exhaust port, said feed back connection, and the connection between the supplemental reservoir and the triple valve device, said secondary valve means having two positions, in one of which it opens said exhaust port and the supplemental reservoir connection and closes said feed back connection, and in the other of which it opens said feed back connection and closes said exhaust port and supplemental reservoir connection; and electric means for actuating said secondary valve.

9. The combination of a brake pipe; an auxiliary reservoir; a brake cylinder; a triple valve connected with said brake pipe, brake cylinder and reservoir and having at least one application position in which it connects the brake cylinder and reservoir; an electrically controlled valve controlling an exhaust passage from the brake cylinder and a feed back connection from the auxiliary reservoir to the brake pipe; means limiting flow in the feed back connection to flow toward the brake pipe; and an engineer's brake valve mechanism arranged to control brake pipe pressure and said electrically controlled valve, and having at least two positions in which it establishes a releasing pressure in the brake pipe, in one of which positions it actuates the electrically controlled valve to close the exhaust connection and open the feed back connection, and in the other of which it actuates the electrically controlled valve to close the feed back connection and open the exhaust connection.

10. The combination of a brake pipe; an auxiliary reservoir; a supplemental reservoir; a brake cylinder; a triple valve connected with said brake pipe, brake cylinder and reservoirs and having at least one application position in which it connects the brake cylinder and the reservoirs together; an electrically actuated valve controlling an exhaust connection from the brake cylinder, a feed back connection from the auxiliary reservoir to the brake pipe, and the connection between the triple valve and the supplemental reservoir; means limiting flow in the feed back connection to flow toward the brake pipe; and an engineer's valve mechanism arranged to control brake pipe pressure and said electrically actuated valve, and having at least two positions in which it establishes a releasing pressure in the brake pipe, in one of which positions it actuates the electrically actuated valve to close the exhaust and supplemental reservoir connections and open the feed back connection, and in the other of which it actuates the electrically actuated valve to close the feed back connection and open the exhaust and supplemental reservoir connections.

11. The combination of a brake pipe; an auxiliary reservoir; a brake cylinder; a triple valve connected with said brake pipe, brake cylinder and reservoir and having a release position and an emergency application position, assumed on substantial depletion of brake pipe pressure, in which it connects the brake cylinder and reservoir; an electrically actuated valve controlling an exhaust passage from the brake cylinder and a feed back connection from the auxiliary reservoir to the brake pipe; means limiting flow in the feed back connection to flow toward the brake pipe; an engineer's brake valve mechanism arranged to control brake pipe pressure and said electrically actuated valve and having at least two positions in which it establishes a releasing pressure in the brake pipe, in one of which positions it actuates the electrically actuated valve to close the exhaust connection and open the feed back connection and in the other of which it actuates the electrically actuated valve to close the feed back connection and open the exhaust connection; and means rendered effective by a moderate rise of brake pipe pressure after an emergency reduction thereof for shifting said triple valve to a position between emergency application position and release position in which the brake cylinder and auxiliary reservoir are connected with each other.

12. The combination of a brake pipe; an auxiliary reservoir; a supplemental reservoir; a brake cylinder; a triple valve connected with said brake pipe, brake cylinder and reservoirs and having a release position and an emergency application position assumed on substantial depletion of brake pipe pressure in which it connects the brake cylinder and the reservoirs together; an electrically actuated valve controlling an exhaust connection from the brake cylinder, a feed back connection from the auxiliary reservoir to the brake pipe, and the connection between the triple valve and the supplemental reservoir; means limiting flow in the feed back connection to flow toward the brake pipe; an engineer's valve mechanism arranged to control brake pipe pressure and said electrically actuated valve and having at least two positions in which it establishes a releasing pressure in the brake pipe, in one of which positions it actuates the electrically actuated valve to close the exhaust and supplemental reservoir connections and open the feed back connection, and in the other of which it actuates the electrically actuated valve to close the feed back connection and open the exhaust and supplemental reservoir connections; and means rendered effective by a moderate rise of brake pipe pressure after an emergency reduction thereof for shifting said triple valve to a position between emergency application position and release position in which the brake cylinder and auxiliary reservoir are connected with each other.

13. The combination of an electro-pneumatic triple valve of the type in which the triple valve has an emergency application position and a release and recharge position and in which an electrically actuated retainer valve may be operated to close the triple valve exhaust port and thus prevent release of the brakes when the triple valve shifts to release and recharge position; valve means operatively related with said retainer valve and arranged to be opened upon the closure thereof, the last-named valve means controlling a one-way flow connection from the brake cylinder to the brake pipe; and means comprising ports in the triple valve rendered effective by motion of the triple valve to release position to close the last-named connection against flow from the brake cylinder to the brake pipe.

14. The combination of an electro-pneumatic triple valve of the type in which the triple valve has an emergency application position and a release and recharge position and in which an electrically actuated retainer valve may be operated to close the triple valve exhaust port and thus prevent release of the brakes when the triple valve shifts to release and recharge position; valve means operatively related with said retainer valve and arranged to be opened upon the closure thereof, the last-named valve means controlling a one-way flow connection from the brake cylinder and auxiliary reservoir to the brake pipe; and means comprising ports in the triple valve rendered effective by motion of the triple valve to release position to close the last-named connection against flow from the brake cylinder to the brake pipe.

15. The combination of a brake pipe; an auxiliary reservoir; a triple valve connected with said pipe and reservoir and having a brake cylinder connection and a brake cylinder exhaust port, said triple valve having a feed back position in which said exhaust port is closed and a feed back connection to the brake pipe is open; a retainer valve also controlling said exhaust port and feed back connection in series with the triple valve and arranged to open said exhaust port and said feed back connection selectively; and electrical means for actuating said retainer valve.

16. The combination of a brake pipe; an auxiliary reservoir; a supplemental reservoir; a triple valve device connected therewith and having an emergency position assumed upon a large reduction of brake pipe pressure, and a feed back position assumed upon a subsequent moderate rise of brake pipe pressure and in which brake cylinder and auxiliary reservoir are connected; and an electrically controlled valve means for establishing a feed back connection from said auxiliary reservoir to the brake pipe.

17. The combination of a brake pipe; an auxiliary reservoir; a supplemental reservoir; a triple valve device connected therewith and having an emergency position assumed upon a large reduction of brake pipe pressure, and a feed back position assumed upon a subsequent moderate rise of brake pipe pressure and in which brake cylinder and auxiliary reservoir are connected; and an electrically controlled valve means for isolating the supplemental reservoir and establishing a feed back connection from the auxiliary reservoir to the brake pipe.

18. The combination of a triple valve having an exhaust port and connections for brake pipe, auxiliary reservoir and brake cylinder; an electrically controlled retainer valve controlling said exhaust port; and means operated as an incident to closure of the retainer valve to open a one-way flow passage from auxiliary reservoir to brake pipe.

19. The combination of a brake pipe; a fluid pressure actuated quick service valve mechanism operable to produce service reductions of brake pipe pressure; a triple valve connected with the brake pipe and arranged to operate in response to service reductions of brake pipe pressure to admit actuating pressure fluid to said quick service valve mechanism; and electrically actuated means independent of the triple valve for admitting actuating pressure fluid to said quick service valve mechanism.

20. The combination of a brake pipe; a fluid pressure actuated quick service valve mechanism operable to vent the brake pipe to produce a service reduction of brake pipe pressure; a triple valve including means operating as an incident to the service function of the triple valve to admit actuating pressure fluid to said quick service valve mechanism; and electrically actuated means independent of the triple valve for admitting pressure fluid from the brake pipe to actuate said quick service valve mechanism.

21. The combination of a brake pipe; a triple valve connected therewith; a pressure actuated quick service valve mechanism subject to control by said triple valve; electrically actuated means independent of the triple valve for admitting air from the brake pipe to the pressure actuated portion of said quick service valve mechanism to actuate the same; and means effective in the release position of the triple valve to vent a portion of the air so admitted, whereby quick service venting is intensified while triple valve remains in release position.

22. The combination of a brake pipe; a quick service venting mechanism for the brake pipe comprising a measuring chamber, a valve controlling flow from said brake pipe to said chamber, and a pressure motor operable to open said valve; a triple valve connected with the brake pipe and including means operable as an incident to the service function of the triple valve to admit actuating pressure fluid to said pressure motor; and electrically actuated means for admitting pressure fluid from the brake pipe to said motor.

23. The combination of a brake pipe; a triple valve connected therewith; a quick service venting mechanism comprising a measuring chamber, a valve controlling flow from said brake pipe to said chamber, and a pressure motor operable to open said valve; electrically actuated means for admitting brake pipe air to said motor; and means effective in release position of the triple valve to vent a portion of the air so admitted whereby quick service venting is intensified while the triple valve remains in release position.

24. The combination of a brake pipe; a triple valve connected therewith; a quick service venting mechanism comprising a measuring chamber, a valve controlling flow from said brake pipe to said chamber, and a pressure motor operable to open said valve; electrically actuated means for admitting brake pipe air to said motor; and means comprising ports in the triple valve, open in lap and release positions thereof, for venting said chamber.

25. The combination of a brake pipe; a triple valve connected therewith; a quick service venting mechanism comprising a measuring chamber, a valve controlling flow from said brake pipe to said chamber, and a pressure motor operable to open said valve; electrically actuated means for admitting brake pipe air to said motor; means effective in release position of the triple valve to vent a portion of the air so admitted whereby quick service venting is intensified while the triple valve remains in release position; and means comprising ports in the triple valve, open in lap and release positions thereof, for venting said chamber.

26. The combination of a brake pipe; a brake cylinder; an auxiliary reservoir; a triple valve device of the type having a feed back position assumed on moderate rise of brake pipe pressure following an emergency reduction thereof and in which the brake cylinder is connected with the brake pipe through a feed back connection, said triple valve device also having a lap position assumed upon a further rise of brake pipe pressure and in which a release insuring passage from the triple valve chamber to atmosphere is opened; secondary valve means normally closing said feed back connection and said release insuring passage; and electric means for actuating said secondary valve means to open the same.

27. The combination of a triple valve having an exhaust port; an electrically controlled retainer valve controlling said exhaust port; and valve means comprising ports in the triple valve and ports controlled by said retainer valve and serving in release following an emergency application to supply auxiliary reservoir air to the brake pipe to increase brake pipe pressure, then upon partial response of the triple valve to such increase in brake pipe pressure to vent auxiliary reservoir air at a restricted rate, and finally upon releasing movement of the triple valve to terminate flow from the auxiliary reservoir.

28. The combination of a triple valve having an exhaust port; an electrically actuated retainer valve controlling said exhaust port; and valve means comprising ports in the triple valve and ports in said retainer valve and serving upon an increase in brake pipe pressure following an emergency reduction thereof, first to feed brake cylinder and auxiliary reservoir air to the brake pipe, then upon motion of the triple valve in response to such increased brake pipe pressure to vent auxiliary reservoir air at a restricted rate to atmosphere and finally upon releasing movement of the triple valve to terminate the discharge of auxiliary reservoir air.

29. The combination of a triple valve having an exhaust port and connections for brake pipe, auxiliary reservoir, supplemental reservoir and brake cylinder, said triple valve functioning in service applications to supply auxiliary reservoir air to brake cylinder and in emergency application to supply air from both reservoirs to brake cylinder; and electrically controlled retainer valve controlling said exhaust port; and means operated as an incident to closure of the retainer valve to isolate the supplemental reservoir from the triple valve and open a one-way flow passage from auxiliary reservoir to brake pipe.

CHARLES A. CAMPBELL.